United States Patent [19]
Demidov et al.

[11] Patent Number: 5,595,358
[45] Date of Patent: Jan. 21, 1997

[54] MULTIPURPOSE AIRBORNE VEHICLE

[76] Inventors: German V. Demidov, ul.Frunze, d.9., kv.173, Kazan, Russian Federation, 420033; Eduard S. Osipov, ul.M.Gorkogo, d.6, kv.22, Kazan, Russian Federation, 420015

[21] Appl. No.: 593,019

[22] Filed: Jan. 29, 1996

Related U.S. Application Data

[63] Continuation of Ser. No. 204,328, filed as PCT/RU93/00161, Jul. 8, 1993, abandoned.

[30] Foreign Application Priority Data

Jul. 8, 1992 [SU] U.S.S.R. .............................. 5051337/23
Dec. 16, 1992 [RU] Russian Federation ........ 92012649/23

[51] Int. Cl.$^6$ .............................. B64C 27/08; B64C 27/22; B64C 15/12; B64C 29/02
[52] U.S. Cl. ...................... 244/7 A; 244/12.2; 244/12.6; 244/17.23; 244/23 C; 244/63
[58] Field of Search .............................. 244/6, 12.2, 12.6, 244/7 B, 7 A, 11, 17.21, 17.19, 17.23, 23 C, 55, 63, 67

[56] References Cited

U.S. PATENT DOCUMENTS

| | | | |
|---|---|---|---|
| 1,749,471 | 3/1930 | Bothezat | 244/17.23 |
| 1,783,011 | 11/1930 | Florine | 244/17.23 |
| 1,786,576 | 12/1930 | Nelson | 244/17.23 |
| 2,711,295 | 6/1955 | Peterson | 244/17.19 |
| 3,005,603 | 10/1961 | Gaskins | 244/6 |
| 3,082,977 | 3/1963 | Arlin | 244/12.2 |
| 3,103,327 | 9/1963 | Parry | 244/17.19 |
| 3,149,803 | 9/1964 | Petrides et al. | 244/17.13 |
| 3,166,040 | 1/1965 | Armantrout et al. | 115/41 |
| 3,181,816 | 5/1965 | Pfleiderer | 244/17.21 |
| 3,834,654 | 9/1974 | Miranda . | |
| 3,889,902 | 6/1975 | Madet | 244/17.23 |
| 4,678,141 | 7/1987 | Sarrantonio | 244/63 |
| 5,079,516 | 1/1992 | Johnson . | |
| 5,178,344 | 1/1993 | Dlouhy | 244/12.2 |

FOREIGN PATENT DOCUMENTS

| | | | |
|---|---|---|---|
| 15381 | 12/1911 | Denmark | 244/6 |
| 2362755 | 3/1978 | France . | |
| 1228859 | 11/1966 | Germany . | |
| 1913028 | 8/1970 | Germany . | |
| 847907 | 5/1977 | U.S.S.R. . | |
| WO84/01926 | 3/1984 | WIPO . | |
| WO89/11185 | 11/1989 | WIPO . | |

OTHER PUBLICATIONS

R. H. Lange, Journal of Aircraft, 1988, No. 5, pp. 385–392.
D. A. Sobolev, "Special–configuration aircraft", Moscow Machiinostroenie Publishers, 1989.
E. I. Ruzhitsky "Bezaerodromnaya aviastsia", 1959, Oborongiz, p. 82, figure figure 77, pp. 152–153, 156–157.
D. A. Sobolev "Samolety osobykh skhem", 1989 Mashinostroenie (Moscow), pp. 153–154.

*Primary Examiner*—Andres Kashnikow
*Assistant Examiner*—Virna Lissi Mojica
*Attorney, Agent, or Firm*—Merchant, Gould, Smith, Edell, Welter & Schmidt

[57] ABSTRACT

The present invention relates in general to aeronautical engineering and concerns specifically transport vehicles for transportation of liquid and loose cargoes. The invention provides an airborne vehicle capable of carrying a multiton cargo from a limited ground area. The object of the invention is accomplished due to the fact that in the airborne vehicle of the present invention the lifting aerodynamic airfoil system is made of two parts, that is, a stationary part in the form of a ring-shaped fuselage 1, consisting of aerodynamic members 2 and 3 curved spanwise, and a movable part in the form of lifting rotor units 6 arranged along the ring perimeter. A power unit of the vehicle comprises a gas-generator, propulsive units, ramjet ducts, and flywheel members interconnected through a reversible rotary-reciprocating engine-supercharger 22 and a fluid converter.

23 Claims, 6 Drawing Sheets

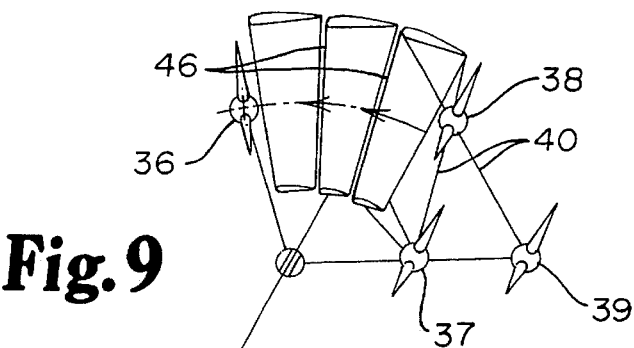
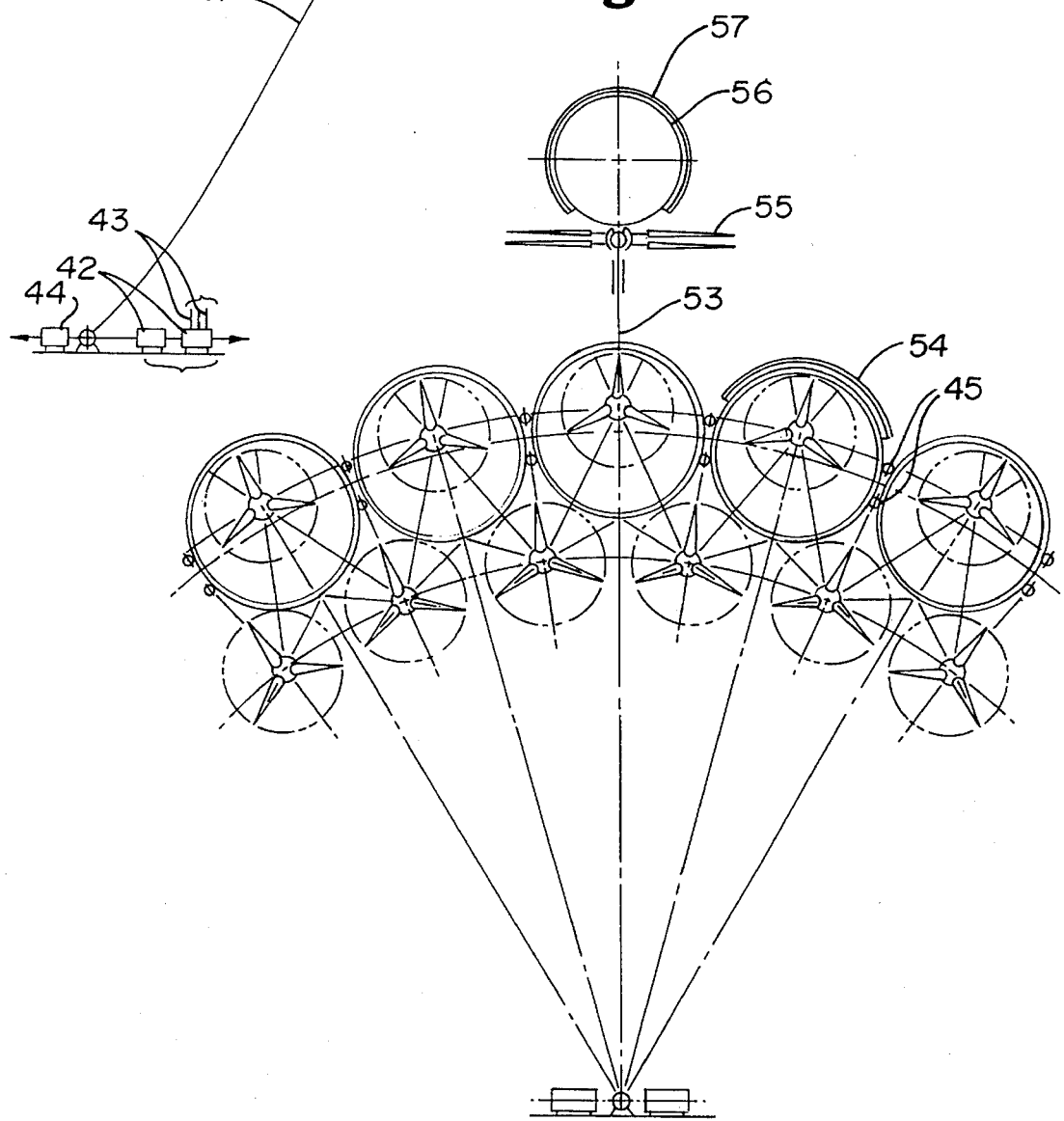

MULTIPURPOSE AIRBORNE VEHICLE

This is a continuation of application Ser. No. 08/204,328, filed as PCT/RU93/00161, Jul. 8, 1993, now abandoned.

TECHNICAL FIELD

The present invention relates in general to aeronautical engineering and more specifically to both intercontinental and conventional airborne vehicles for carriage of liquid and loose cargoes, container shipment, cargo stowed in fuselage compartments, as well as for transportation of large-sized freight weighing up to a few thousand tons carried in an external suspension store.

BACKGROUND ART

Known in the art presently is an airborne vehicle, comprising a fuselage, airfoils tandem-arranged along the fuselage, a power plant arranged underslung with respect to the airfoils, aircraft flight controls, and alighting gears (undercarriages) (A2 PCT/DE 82/00179).

An increased area of the airfoils of the airborne vehicle due to the tandem arangement thereof along the fuselage and underslung arrangement of the power plant with respect to the airfoils, as well as due to interaction between the air and gas flows, result in improved aerodynamic characteristics of the airfoil; however, the task of increasing the useful load up to a few thousand tons of cargo stowed in the fuselage cannot be achieved. Moreover, no possibility of vertical take-off and landing is provided.

Attempts aimed at improvement in the performance characteristics of an airborne vehicle, attaining an increased load weight and a posibility of the airborne vehicle basing on short runways resulted in the development of the "flying wing" configuration of an aircraft with the spanwise load distribution.

One prior-art airborne vehicle is known to comprise a wing-shaped fuselage incorporating a fuel compartment and a cargo compartment, both being located lengthwise of the wing span, a power plant featuring an upper configuration above the airfoil, mechanical lift-increasing devices for flight control, and alighting gears (cf. Lange R. H., Journal of Aircraft, 1988, No.5, pp. 385–392).

Use of such configuration enables one to reduce the direct running costs by fifty percent compared with a fuselage-type airborne vehicle; however, problems involved in low effectiveness of the wing-landing device remain unsolved up till now.

Known at present is an aircraft available from Lockheed Corp. (Ring Wing), comprising a fuselage, a ring wing, a fuselage-mounted power plant, flight controls, and alighting gears. The layout and construction of said aircraft make it possible to considerably decrease the induced drag of the airfoil and render the wing lighter in weight by fifty percent (cf. "Special-configuration aircraft" by D. A. Sobolev, Moscow Mashinostroenie Publishers, 1989) (in Russian).

One more airborne vehicle is known to comprise a fuselage, a single-rotor system consisting of an airfoil and a fuselage-enclosed fan with an adjustable angle of blade setting, flight controls, and alighting gears (A2 PCT/EP 89/00489).

However, limited-area airfoils prevent transportation of large-weight cargo.

An airborne vehicle is known, wherein with a view to improving its performance characteristics and increasing the weight of useful load, use is made of a single-rotor aerodynamic lifting system appearing as a spanwise constant-airfoil supersonic wing provided with jet engines at the ends of the wing blades (A1 US No3,116,040).

However, the aforementioned single-rotor system fails to provide very high thrust forces.

A single-rotor aircraft configuration may be used in a combined transportation system, said configuration being of the two-row type, wherein the blades of each row rotate in the opposite directions, and the system has a power cable for transmitting power to a ground transport vehicle (A1 US No.3,149,803).

Such a combined transportation system involves generation of much power to supply the ground transport vehicle.

A prior-art cargo aircraft is known, wherein spares made of hollow tubes are provided in a rectangular wing over the entire span thereof, said spares being arranged along straight lines in said wing, while the tubes are arranged in tandem along a chord so as to fall within the limits of the wing section. This aircraft configuration is aimed at attaining a higher load ratio and facilitating cargo handling operations (A1 SU No.847,907).

DISCLOSURE OF THE INVENTION

It is a primary object of the present invention to provide an airborne vehicle capable of lifting a multiton cargo from a limited- area ground; more specifically, the invention is aimed at increasing the aircraft lift equivalent to a useful load up to a few thousand tons within a wide range of flight speeds.

One more object of the invention is to decrease the over-all weight of the whole construction.

The foregoing objects are accomplished due to the fact that a multipurpose airborne vehicle comprises a fuselage, a wing, and a power unit. The fuselage is made up of two aerodynamic lifting airfoils featuring a curvature over the span thereof and joined together in a horizontal plane of the aircraft to form a ring. The power unit consists of several gas-turbine engines, each having a ramjet duct, a shortened jet nozzle, an afterburner, and a flywheel member.

The present multipurpose airborne vehicle comprises also rotor units provided with a control actuator for their blades. The rotor units have nozzles arranged along the axis of rotation at the ends of the rotor blades and are joined together with said ring along its perimeter with a possibility of rotation so as to form a movable portion of the aircraft airfoils.

The blades of the rotor units are interconnected by a synchronized transmission system and the blades of the adjacent rotor units are spaced apart from each other a distance which provides for a cyclic formation of an integral ring-shaped system.

Each of the rotor units is pivotally mounted on the ring so as to be turned, by means of the control actuator, with respect to the ring to assume a preset position.

The power unit has additional ramjet ducts interposed between the rotor units.

The ring has toroidal spaces-compartments for fuel and/or useful load and/or control system.

The ring may have spaces-compartments arranged lengthwise of its chord which are intended for fuel and/or useful load and/or control system.

A shock-wave generator is additionally provided at the end of the shortened nozzle of the gas-turbine engine, said generator being in fact a number of rotary bodies driven from a gas generator.

The shock-wave generator appears as rod-shaped bluff bodies provided with shaped channels, open-end ones inclusive, in the plane of rotation. The channels have a cross-sectional aspect as a convergent-divergent (Laval) nozzle with liquid side walls in the throat section thereof, which are established by the fuel supplied from the cooling jacket of the nozzle subsonic section. Flywheel members are provided past the generator coaxially therewith, said members being displaced from one another and appearing as a number of rods featuring their cross-section gradually decreasing in each next row streamwise.

The flywheel members are connected to the blades of the rotor unit and to the rotor of the gas-turbine engine through series-arranged, reversible supercharge engine of the rotary-reciprocating type and a fluid converter.

The front edge of the ring and the external surface of the lifting airfoils which adjoin thereto serve as the wall of a solar-type hydrogen heat-exchanger whose flaring-out outlet communicates, through a control member, with the inlet of the power unit and with that of the additional ramjet duct.

Provision is made in the present multipurpose airborne vehicle oxidizer tanks connected to the combustion chambers of the gas-turbine engines.

The ring has attachment of the guy store of the large-sized cargo stowing devices.

The ring tanks may be filled with a gas having a density lower than that of the ambient air.

The rotor units are in fact windmills connected to the ground power consumers through a power transmission system.

Additional rotor units-windmills are provided ahead of the ring in the horizontal plane of the airborne vehicle, the left windmill featuring the right-hand sense of rotation upstream in the airflow, and the right windmill having the left-hand sense of rotation upstream in the airflow. The longitudinal axes of the windmills located past the ring are displaced from the longitudinal axis of the vehicle towards a higher pressure developed on the airfoils as a result of the windstream flowing around the ring.

The airborne vehicle is provided with shaped air intakes for the power unit, which are established by the initial portion of the ring external surface.

The airborne vehicle comprises a bank of series-connected air compressors communicating, through a pressure intensifier, with the respective windmills. The last compressor is connected to a delivery hose appearing as a thin-walled metal tube wound on its external surface with a composite material and aimed at supplying compressed air to the ground consumer, while the first compressor at the inlet is connected to said respective air intake.

The present vehicle has an additional windmill located past the ring on an external store and facing downward of the windstream, the store elements appearing as additional delivery hoses filled with the working medium under pressure to form a truss structure.

The present vehicle is provided with film-type solar converters having their electric output connected to the power consumer.

The ring has a number of brackets carrying joining elements for docking one vehicle together with another.

The tip portions of the rotor unit blades have attachment points, said points of each two diametrally opposite blades being inerconnected by a rodlike element made up of a bundle from a composite material based on unidirectional high-strength fibers.

The airborne vehicle duscussed herein is provided with a receiver whose housing carries a second row of the rotor units featuring the sense of rotation opposite to that of the adjacent one, the tip portions of the blades of the second-row rotor units being also provided with attachment points, said points of each two diametrially opposite blades being interconnected by a rodlike element made up of a bundle from a composite material based on high-strength unidirectional fibers.

BRIEF DESCRIPTION OF THE DRAWINGS

To promote understanding of the present invention given below is a specific exemplary embodiment thereof with reference to the accompanying drawings, wherein:

FIG. 9 is a schematic longitudinal sectional view of the airborne vehicle used as a windmill electric generating plant; and FIG. 10 is a schematic front view of the airborne vehicles while docking.

BEST METHOD OF CARRYING OUT THE INVENTION

Figure 1:
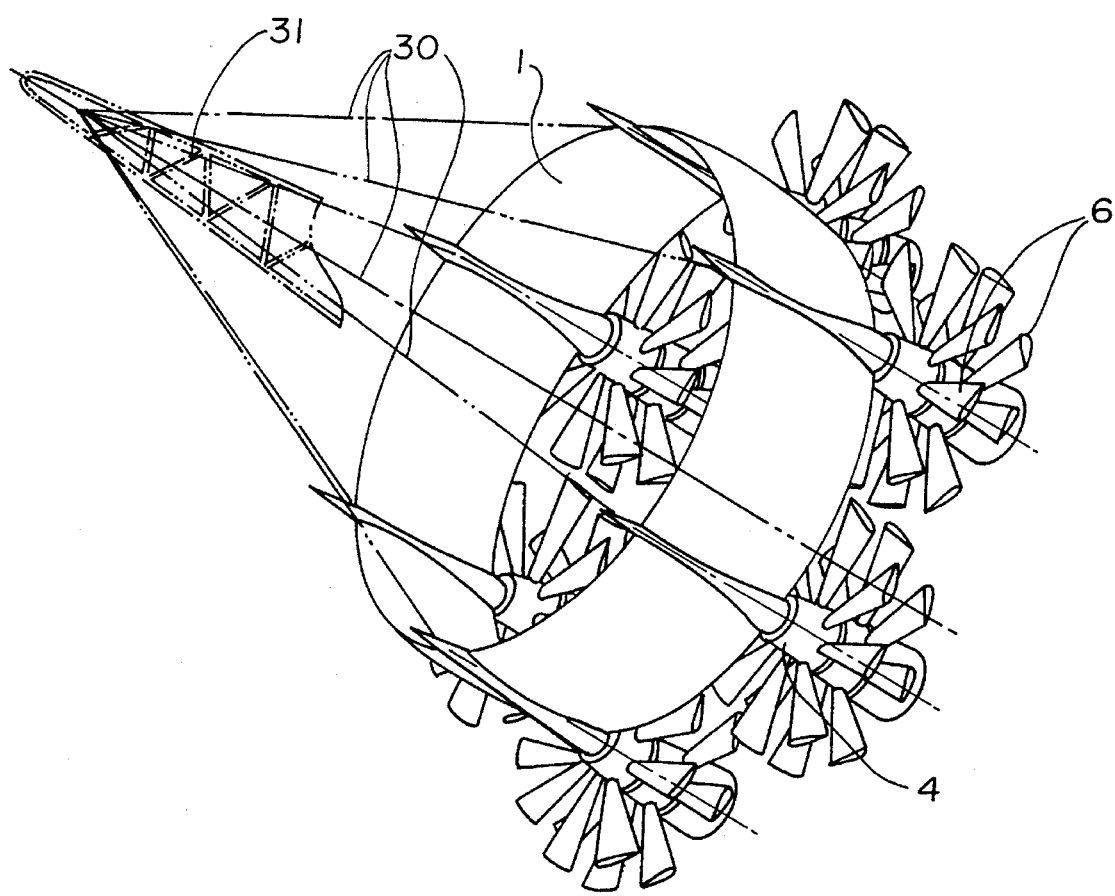
FIG. 1 is an isometric view of the airborne vehicle disclosed herein.

The multipurpose airborne vehicle of the present invention comprises a fuselage 1 which is made up of two aerodynamic lifting airfoils 2, 3 which are stationary with respect to the vehicle and featuring a curvature over the span thereof, and which are capable of developing a unidirectional lift, said airfoils being integrated into a ring in the vehicle horizontal plane, by a common axis. Gas-turbine engines 4 enclosed in conical compartments 5 of the fuselage 1 (FIG. 1) are arranged along the perimeter of the ring-fuselage.

Figure 2:
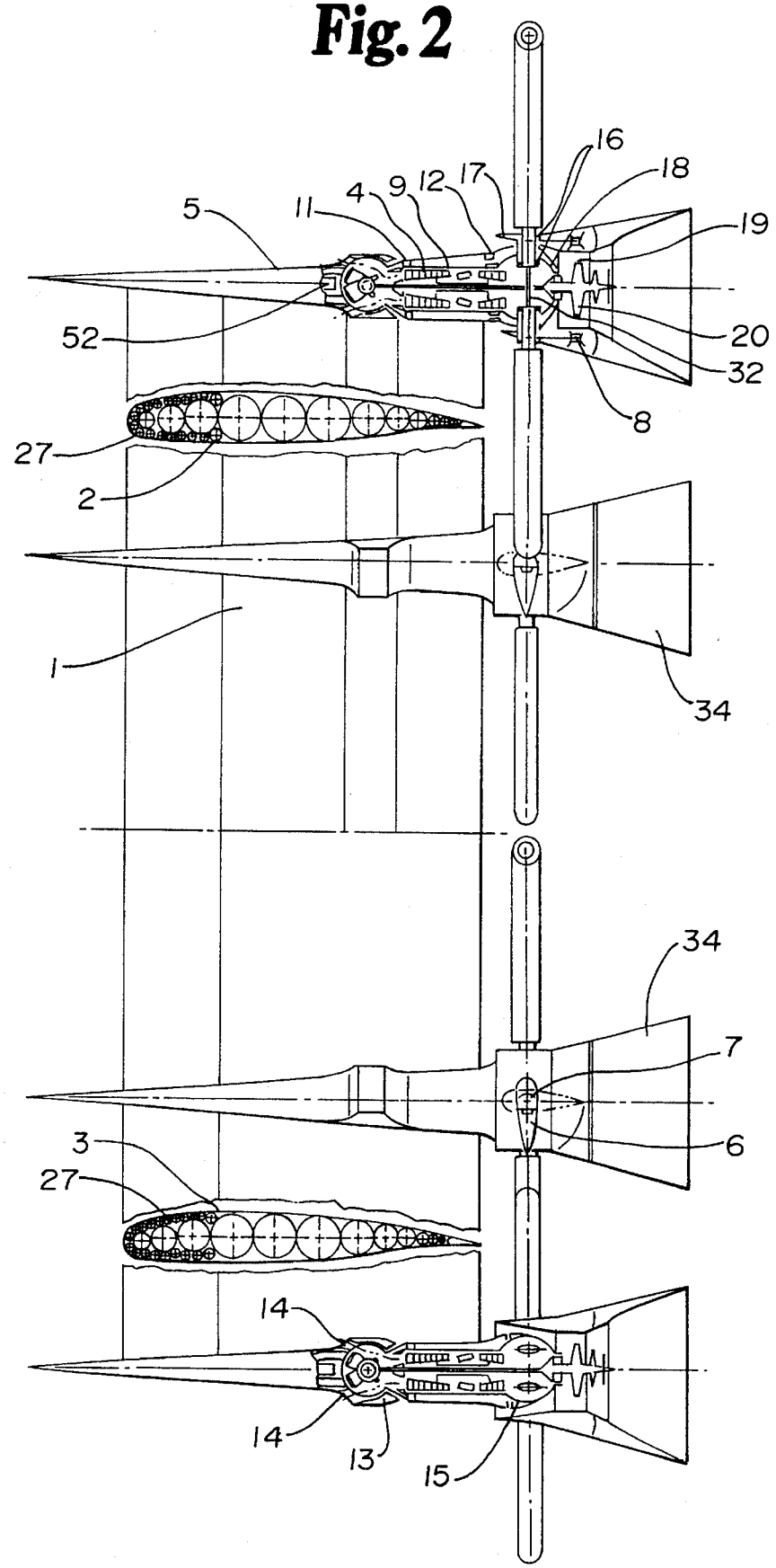
FIG. 2 is a schematic longitudinal sectional view of the airborne vehicle disclosed herein.

A plurality of airfoil-shaped rotor blades 6 are situated behind the rear edge of the aerodynamic airfoils 2 and 3, said blades constituting a set of rotor units which establish a movable part of the vehicle lifting airfoil. The rotor blades feature a variable profile over their span and are provided with a jet drive, i.e., a nozzle 7, at the ends thereof. The blades 6 are connected to a drive of control surfaces which appears as a control actuator 8 aimed at rotating the blade 6 round the longitudinal axis in order to change the blade pitch angle according to a change in the windstream velocity (FIG. 2).

The rotor unit is held by a rotary housing 9 such that use is made of the housing of the gas-turbine engine 4, which is mounted on a hinge joint 10 in the ring-shaped fuselage 1 and is adapted to be set, through the control actuator (omitted in the Drawing) of the vehicle control system, to a predetermined position of the blade axes. The other part of the control actuator not shown in the Drawing, is aimed at providing an adjustable blade tip twist angle by straining the blade tip in the zone of elastic strain of the structural material the blade 6 is made of.

Figure 5:
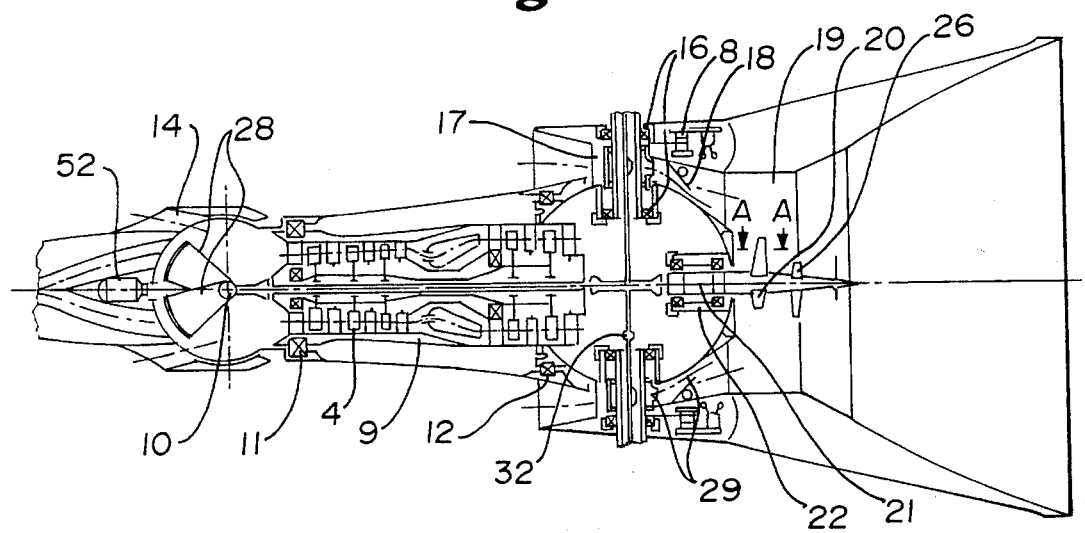
FIG. 5 is a schematic longitudinal sectional view of the power unit.
Figure 6:
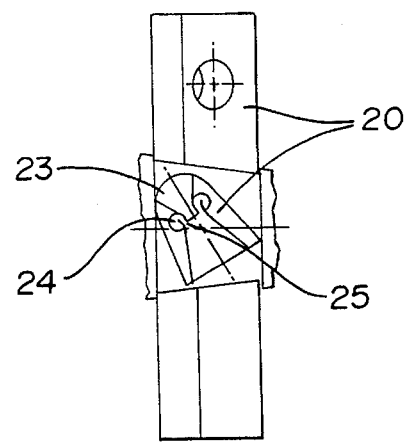
FIG. 6 is a schematic view of the flywheel members showing a liquid component admission passage.

The rotary housing 9 is installed on supports 11, 12. Toroidal compartments are fitted into the ring 1 for holding fuel and the cargo being transported, both being under a positive pressure. A spherical housing 13 is in fact the basic element of an air intake 14 of the gas-turbine engine 4. A tail portion 15 of the rotary housing is spherical-shaped and carries swivel joints 16 for the blades 6 to turn about their longitudinal axis (FIG. 5). A system of ramjet ducts is mounted on arms 17 made fast on the tail portion of the rotary housing 15. The space past the turbine of the gas-turbine engine 4 communicates with the interior space of the jet drive 7 and with a convergent shaped exhaust unit 18 which is made up of the nozzle unit elements with the control members secured in the arms of the shaped air intake of the ramjet section. The same arms mount switchover control members (omitted in the Drawing) aimed at opening the passage area of the exhaust unit 18 in response to an increase in the blade pitch angle.

The elements of the exit portion of the exhaust unit 18 of the gas-turbine engine 4 together with the tail portion of the rotary housing shaped as the body of the shortened externally divergent nozzle and together with the internal surface of the shaped air intake of the ramjet duct establish the entrance portion of an afterburner 19 of the ramjet duct. The afterburner 19 comprises a shock-wave generator 20 appearing as bodies of revolution.

The generator 20 is of the flywheel type. The flywheel members are aimed at damping shock waves, thus protecting the airborne vehicle construction against destructive vibratory effects of said waves. The shock-wave generator 20 is connected to the ring 1 of the airborne vehicle and to the rotary housing 9 to which the blades 6 are held, through a fluid converter 21 and a reversible engine-supercharger 22 of the rotary-reciprocating type. The shock-wave generator 20 is held fast on the end face of the shortened externally divergent nozzle at the inlet of the afterburner 19. The flywheel-type bodies of revolution of the shock-wave generator 20 appearing as rod-shaped bluff bodies, have shaped channels capable of torque development, including through channels 23 which are in fact the Laval nozzle supplied with liquid fuel through a passage 24, whereupon the liquid fuel is forwarded for atomization through an annular channel 25 at its narrowest cross-section, said annular channel being established by the external surface of the liquid passage and the internal surface of the gas passage of the high-velocity flow. Coaxial flywheel members are additionally provided in the following rows and displaced with respect to one another, said members apearing as rods 26 having their cross-section gradually decreasing in each next row streamwise.

The front edge of the ring 1 and the surface of the vehicle lifting airfoils adjacent to said edge are in fact walls 27 of a solar-type hydrogen heat-exchanger. The divergent outlet communicates, through a control member 28, with the inlet of the gas-turbine engine, said control member being adapted to open at high engine speeds. The outlet of the solar-type heat-exchanger communicates, through control members, with a nozzle unit 29 of the additional ramjet duct. The outlet of the solar-type heat-exchanger may serve, under abnormal (emergency) conditions, as an element of emergency escape and recovery system.

Figure 3:
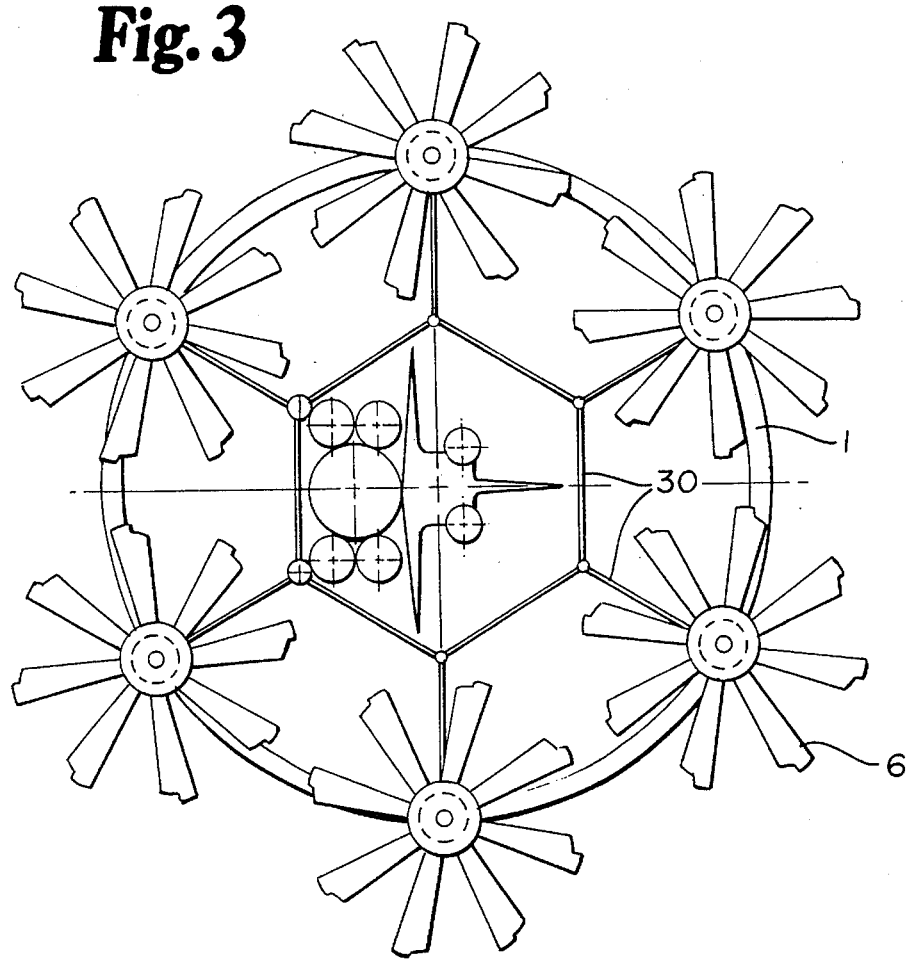
FIG. 3 is a longitudinal sectional view of the airborne vehicle of the present invention, showing a large-sized cargo attached to the external guy store.
Figure 4:
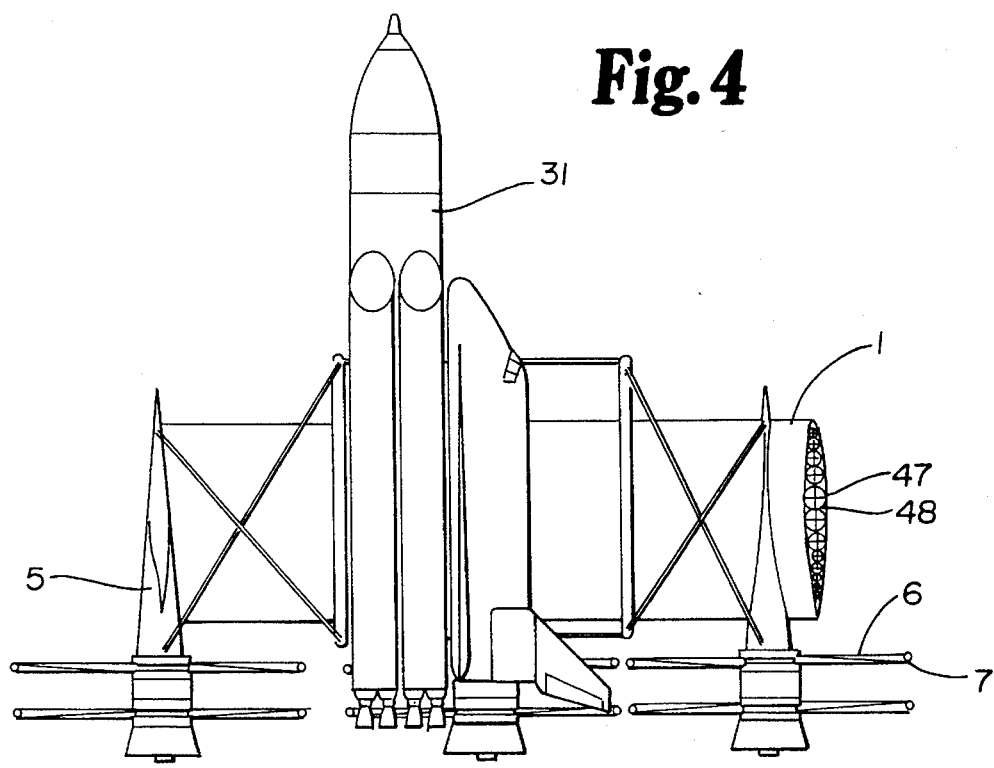
FIG. 4 is a bottom view of the airborne vehicle of the present invention, showing a large-sized cargo attached to the external guy store.

The gas-turbine engine combustion chamber communicates, through control members, with the system of oxidizer feeding from its tank in order to preheat the working medium. The liquid component supply passage 24 of the shock-wave generator 20 communicates additionally with cargo tanks filled with liquid cargo, through control members and a supply system. Attachment points of the guy suspension 30 of the devices for stowing a large-sized cargo 31 are additionally provided on the external surface of the inside part of the conical engine compartments of the housing of the ring 1. Provided at the ends of the blade 6 are attachment points which are interconnected pairwise in the diametrally opposite blades by a rod 32 appearing as the bundle of a composite material comprising unidirectional high-strength fibers. When a heavier cargo is to be handled use is made of the receiver housing to which the blades of a second row of the rotor unit having an opposite sense of rotation are held, while the power unit producing the working medium for the double-row rotor unit appears as a bank of gas-turbine engines. The attachment points of the tips of the blades 6 in the first row are interconnected by rods made up of a bundle of a composite material comprising high-strength unidirectional fibres having one of its ends secured on the attachment points and the opposite end made fast in a closed polygonal bar shaped as a truss situated on the rotor unit longitudinal axis. Interconnection of the blade attachment points in the second row is similar to that in a single-row rotor unit (FIGS. 3, 4).

Provision is additionally made for air intakes 33 (FIGS. 7, 8) of the system of ramjet ducts, said air intakes being established by the initial portion of the ring external surface and are located on the front external end face of the ring 1. The front end face of the ring 1 makes up an angle with the longitudinal axis, whereby the aerodynamic drag of the vehicle can be reduced. The alighting gears of the vehicle are shaped as bearing surfaces (omitted in the Drawing) fastened on a tail portion 34 of the power unit exhaust assembly. The tail portion 34 is rotatable with respect to the rest of the housing of the ramjet duct.

The elements of the power unit of the airborne vehicle can be used as a power actuator for a variety of mechanisms and ground transport facilities. To this end, a working machine is provided on the power unit housing, appearing as an electric generator 35 whose output may additionally be connected to the ground power consumer.

The rotor units are directly connected, through a disengageable clutch, to the working machine. Rotor units 36, 37, 38 are driven by the windstream, and a rotor unit 39 is located on the external suspension downward of the windstream past the ring 1, the external suspension being in fact a number of additional delivery hoses forming a truss structure after having been filled with pressurized working medium.

The rotor units 36–39 operating as windmills are situated before the ring 1 in the horizontal plane of the airborne vehicle, The left windmill rotates clockwise upstream in the airflow, and the right windmill rotates counter-clockwise. The longitudinal axes of the windmills situated past the ring are displaced with respect to the vehicle longitudinal axis towards a higher pressure developed on the lifting airfoils as a result of the windstream flowing around the ring (FIG. 9).

The working machine in the form of a compressor made use of in the present airborne vehicle may be connected to the rotor units to establish a soaring platform. The output of the working machine is connected on the ground, through a device 41 for power transmission to the ground, with a power-generating machine 42, which comprises series-connected a turbogenerator and a water electrolyzer. The output of the machine 42 is connected, through control members, to a power accumulator 43 and a power consumer 44, as well as to the vehicle fuel tanks. The working machines in the form of compressors are interconnected, through a pressure intensifier, to a respective windmill. The flow sections of the compressors are so interconnected that the inlet of each next compressor communicates with the outlet of the preceding one. The outlet of the last compressor is provided with the device 41 for power transmission from the airborne vehicle, said device appearing as a delivery sleeve made up of a thin-walled metal tube wound on its external surface with a composite material. The sleeve is held to a rotary drum of the attachment point having a radius providing permissible strain of the delivery sleeve when in the wound state (FIG. 10).

The outlet end of a suction hose may be held to the airborne vehicle, inlet end of the which is located in a mine shaft for sucking out a combustible explosive gas therefrom, while the outlet itself of said hose communicates with the system of fuel supply to the power unit.

There may be situated on the external ring surface brackets carrying joining elements 45 aimed at docking with other airborne vehicles.

Figure 7:
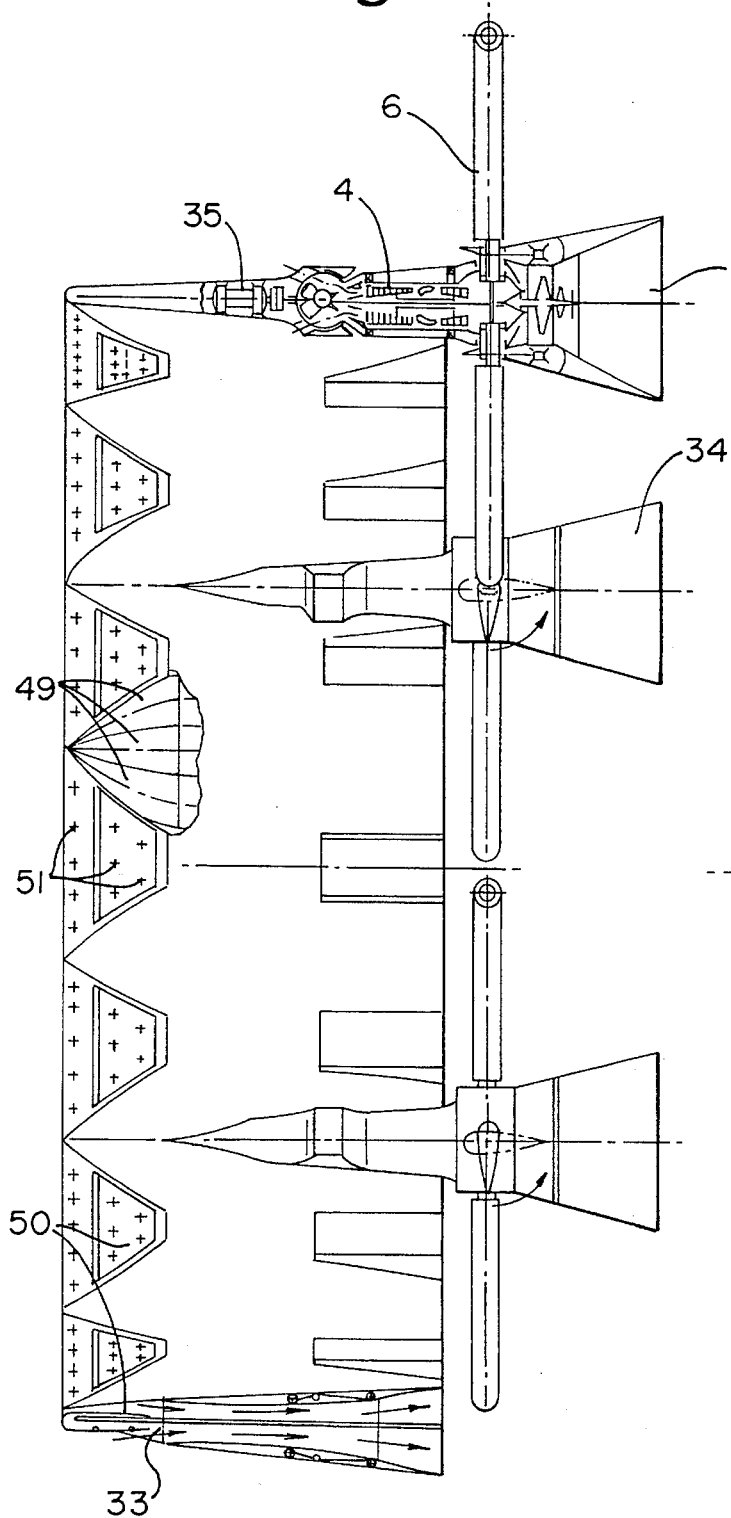
FIG. 7 is a schematic longitudinal sectional view of the airborne vehicle provided with windmills.
Figure 8:
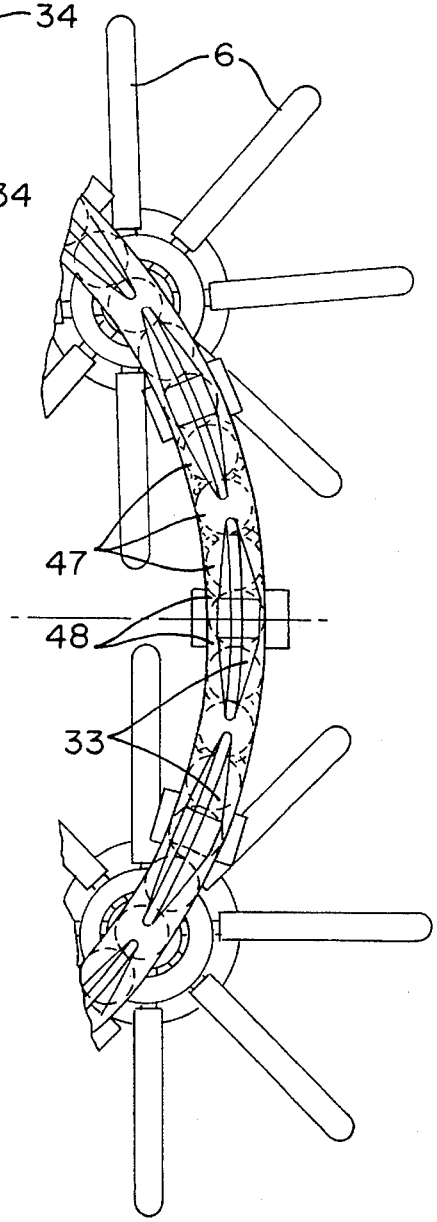
FIG. 8 is a front of a portion of the airborne vehicle of FIG. 7.

Channels 46 may be provided in the ring, which establish a slotlike aerodynamic section, the longitudinal axis of the said channels has a curvature in a vertical plane (FIG. 7). The main structural frame of the ring 1 may be constituted by housings 47 with a positive pressure thereinside, fabricated with the use of winding techniques and held together by brackets 48 located on the external surface of the ring 1.

The initial portions of the housings 47 of a channel surface 49 establish an additional intake having adjustable elements 50 of the flap type with a possibility of fuel supply at the inlet section through a fuel feed device 51. There may be provided on the present vehicle a self-contained gas generator 52 to supply gas to the flywheel elements 26. To provide electric power supply to the airborne vehicle, film-type solar converters 54 may be arranged on the external vehicle surface. The electric output of said converters is connected to both the controls of the vehicle and the power consumer, which may be in effect the receiving and transmitting equipment for a TV relay station which may additionally be fitted on an external store 53 carrying also the antennas which are arranged on an additional aerostatodynamic platform.

An aerodynamic lift is created by a rotating-blade propulsive device 55, while an aerostatic component of the lift is developed by a device 56 whose surface carries film-type solar converters 57. The soaring platform is adjustable for altitude (FIG. 9).

The airborne vehicle disclosed herein functions as follows.

The present multipurpose airborne vehicle takes off vertically. First the gas-turbine engines 4 are started and the working medium is fed, via the interior of the rotary housing 15 and along the passages of the hollow shafts of the blades 6 into the interior space of the jet drive 7. Thus, the entire set of the rotor units is spun up. Provision is also made for spinning-up of the rotor units from the flywheel members when the latter are interconnected through the fluid converter and the reversible rotary-reciprocating type engine-supercharger, which makes it possible, as spinning-up proceeds, to store energy for take-off, using a difference between the rotation frequency of the rotor units and that of the flywheel members.

An increase in the lift is attained due to a quick deflection of the blades 6 about their longitudinal axis by means of the control surfaces driven from the control actuator 8 and by setting the rotor units to a predetermined position of the axes of the blade rotors with respect to the hinge joint 10, with the result that take-off occurs.

With the presence of an excess thrust, the vehicle is accelerated. While in flight the vehicle is balanced by changing the pitch angle of the blades 6 of the individual rotor units to effect longitudinal or directional stability and controllability, respectively, along with a change of the engine thrust conditions in the other rotor units.

As the vehicle is accelerated, the position of its vertical axis changes from the vertical to the horizontal. The pitch angle of the blade 6 is changed according to a change in the vehicle flight speed, thus providing a required blade angle of attack with respect to the upstream inflow angle. As the vehicle is being accelerated and its tilt angle is being varied, the magnitude of the lift force of the stationary part of its lifting airfoil changes from zero to the maximum, whereas the lift force magnitude effective on the rotary part of the common aerodynamic lifting airfoil of the vehicle is reduced, respectively.

Landing and braking of the vehicle are performed in a way similar to the take-off and acceleration procedure but in a reverse order.

Functioning of the vehicle under emergency conditions consists in transition of the vehicle to the landing regime and selecting the afterburner (reheat) of the power unit by establishing communication between the solar heat-exchanger and the gas-turbine engine inlet, or by selecting the rotor units in order to create a positive load factor on the ring-shaped fuselage 1 with the purpose of safe uneventful landing. Landing is carried out on the bearing surfaces fixed on rotary tail portion 34 of the power unit exhaust assembly. Braking of the rotating rotor units is effected with the aid of the fluid converter integrated with the rotary-reciprocating-type engine-supercharger. The flywheel members are also braked.

Special operations can be carried out with the vehicle, e.g., transporting large-sized cargo and unloading for a geological surveying party, ascending a lightened vehicle and its subsequent use as a soaring platform for power generation by virtue of wind load and then transmitting the generated power to ground consumers.

Another special operation performed by the vehicle may be the use of the latter for aerosol irrigation of sown areas with the aid of the rotor units rotating by virtue of the power generated by the flywheel members situated on the vehicle external surface.

Industrial Applicability

The present invention may effectively be applied as a transport vehicle having a high and very high cargo-carrying capacity (2000–6000 tons) and featuring vertical take-off and landing using a ground area. The vehicle can handle both liquid and cargoes, and containerized solid cargoes stowed inside the ring-shaped fuselage, while large-sized cargoes are carried by external store.

The present invention can also find utility when applied as a technological means in farming practice for aerosol irrigation of sown areas having any terrain and a size of regional-significance, without causing any ecological deviations in the form of soil salination, use being in this case made of the flywheel members for developing thrust by rotating blade-type propulsive devices.

Furthermore, the invention is applicable for extinguishing forest fires on vast areas rather remote from developed infrastructure, featured by a short-time flight for repeated water intake.

The invention can find application also as a shuttle-type element of fluid product pipelines for raw stock delivery in the chemical industry.

The invention can also be used as a technological means in erection work, or as a means of quick response in rescue operations on water areas.

The invention can also be employed as a platform for the recoverable booster stage of a multi-launched spacecraft.

We claim:

1. A multipurpose airborne vehicle, comprising a fuselage, a wing, and a power unit, the fuselage having span-wise-curved aerodynamic lifting airfoils joined together in a horizontal plane of the vehicle to form a ring, the power unit having several gas-turbine engines, each having a ramjet duct, a shortened jet nozzle, an after-burner, and a flywheel member, said vehicle also having rotor units with blades and also provided with a control actuator for the blades, the rotor units having nozzles arranged along the axis of rotation at the ends of the rotor blades and being joined together with said ring, said vehicle also including means for rotating the rotor units with respect to the lifting airfoils so as to form a movable part with respect to the vehicle lifting airfoils.

2. A multipurpose airborne vehicle according to claim 1, wherein the blades of each of the rotor units are interconnected by a synchronized transmission system and the blades of adjacent rotor units are spaced apart from each other a distance which provides for a cyclic formation of an integral ring shaped system.

3. A multipurpose airborne vehicle according to claim 1 wherein each of the rotor units is pivotally mounted on the ring so as to be turned by the control actuator with respect to the ring to assume a preset position.

4. A multipurpose airborne vehicle according to claim 1 wherein the power unit has additional ramjet ducts interposed between the rotor units.

5. A multipurpose airborne vehicle according to claim 1 wherein the ring has toroidal spaces-compartments for fuel, useful load, or control system.

6. A multipurpose airborne vehicle according to claim 1 wherein the ring has spaces-compartments arranged lengthwise of a chord thereof for holding fuel, useful load, or control system.

7. A multipurpose airborne vehicle according to claim 1 including a shock-wave generator at an end of the shortened nozzle of the gas-turbine engine, said generator being a plurality of rotary bodies driven from a gas generator.

8. A multipurpose airborne vehicle according to claim 7, wherein the shock-wave generator includes rod-shaped bluff bodies provided with shaped channels which have an open-end in the plane of rotation, said channels forming a nozzle with liquid side walls in a throat section established by fuel supplied from a cooling jacket of the shortened nozzle of the gas-turbine engine, said shock-wave generator including flywheel members displaced from one another and appearing as a number of rods having cross-section gradually decreasing in each next row stream-wise.

9. A multipurpose airborne vehicle according to claim 8 including means for connecting the flywheel members to the blades of the rotor unit and to the rotor of the gas-turbine engine through a series-arranged reversible engine-supercharger of the rotary-reciprocating type and a fluid converter.

10. A multipurpose airborne vehicle according to claim 1 wherein the front end of the ring and the external surface of the lifting airfoils which adjoin thereto serve as a wall of a solar-type hydrogen heat-exchanger whose flaring-out outlet communicates, through a control member, with the inlet of the power unit and with that of the additional ramjet duct.

11. A multipurpose airborne vehicle according to claim 10, including oxidizer tanks for communicating with combustion chambers of the gas-turbine engines.

12. A multipurpose airborne vehicle according to claim 1 wherein the ring includes attachments for guy-type external store of cargo stowing devices.

13. A multipurpose airborne vehicle according to claim 1 wherein the ring tanks contain a gas having a lower density than ambient air.

14. A multipurpose airborne vehicle according to claim 13 wherein the rotor units are windmills and said vehicle includes means for connecting the windmills to ground power consumers through a power transmission system.

15. A multipurpose airborne vehicle according to claim 14 including some of said windmills being provided before the ring in the horizontal plane of the vehicle, said windmills including a left windmill rotating clockwise upstream in the airflow and a right windmill rotating counterclockwise upstream in the airflow, said windmills having longitudinal axes so that the longitudinal axes of the windmills located past the ring are displaced from the longitudinal axis of the vehicle towards a higher pressure developed on the airfoils as a result of the windstream flowing around the ring.

16. A multipurpose airborne vehicle according to claim 1, including shaped air intakes for the power unit thereof, said intakes being established by the initial portion of the ring external surface.

17. A multipurpose airborne vehicle according to claim 1 including a bank of series-connected air compressors which communicate, through a pressure intensifier, with the respective windmills; said compressors having a last compressor being connected to a delivery hose appearing as a thin-walled metal tube wound on its external surface with a composite material and aimed at supplying compressed air to the ground consumers, while said compressors having a first compressor at the inlet begin connected to said respective air intake.

18. A multipurpose airborne vehicle according to claim 17 wherein said windmills include one windmill located past the ring on an external store and facing downward of the windstream, the store elements appearing as additional delivery hoses filled with working medium under pressure to form a truss structure.

19. A multipurpose airborne vehicle according to claim 12 including film-type solar converters whose electric output is connected to the power consumer.

20. A multipurpose airborne vehicle according to claim 12 wherein the ring has channels forming a slotlike aerodynamic section.

21. A multipurpose airborne vehicle according to claim 1 wherein the ring has a plurality of brackets which carry joining elements for docking one vehicle with another.

22. A multipurpose airborne vehicle according to claim 1 wherein the rotor unit blades have tips with attachment points, said points of each two diametrically opposite blades being interconnected by a rodlike element made of a bundle of a composite material of unidirectional high-strength fibers.

23. A multipurpose airborne vehicle according to claim 22 including a receiver with a housing having a second row of rotor units having rotation opposite to that of the adjacent one, the tips of the blades of the second-row rotor units being also provided with attachment points, said points of each two diametrically opposite blades being interconnected by rodlike elements made of a bundle of a composite material of high-strength unidirectional fibers.

* * * * *